United States Patent
Lee

(10) Patent No.: US 9,768,474 B2
(45) Date of Patent: Sep. 19, 2017

(54) DETACHABLE VOLTAGE SENSING MODULE AND BATTERY DEVICE HAVING SAME

(71) Applicant: SK INNOVATION CO., LTD., Seoul (KR)

(72) Inventor: Yun Nyoung Lee, Gyeonggi-do (KR)

(73) Assignee: SK INNOVATION CO., LTD., Seoul (KR)

( * ) Notice: Subject to any disclaimer, the term of this patent is extended or adjusted under 35 U.S.C. 154(b) by 46 days.

(21) Appl. No.: 15/025,604

(22) PCT Filed: Nov. 13, 2014

(86) PCT No.: PCT/KR2014/010885
§ 371 (c)(1),
(2) Date: Mar. 29, 2016

(87) PCT Pub. No.: WO2015/072758
PCT Pub. Date: May 21, 2015

(65) Prior Publication Data
US 2016/0240893 A1    Aug. 18, 2016

(30) Foreign Application Priority Data
Nov. 13, 2013 (KR) ........................ 10-2013-0137577

(51) Int. Cl.
*H01M 10/42* (2006.01)
*H01M 10/48* (2006.01)
(Continued)

(52) U.S. Cl.
CPC ......... *H01M 10/425* (2013.01); *B60L 3/0046* (2013.01); *B60L 3/04* (2013.01);
(Continued)

(58) Field of Classification Search
CPC ........... H01M 10/425; H01M 10/4235; H01M 10/482
See application file for complete search history.

(56) References Cited

U.S. PATENT DOCUMENTS

| 2014/0247858 A1* | 9/2014 | Hong | H01M 10/486 374/142 |
| 2015/0132630 A1* | 5/2015 | Kim | H01M 2/204 429/121 |

FOREIGN PATENT DOCUMENTS

| KR | 20-0354344 Y1 | 6/2004 |
| KR | 10-2012-9951808 A | 5/2012 |

(Continued)

OTHER PUBLICATIONS

International Search Report for priority PCT/KR2014/010885; dated Feb. 26, 2015; 2 pages.

*Primary Examiner* — Stewart Fraser
(74) *Attorney, Agent, or Firm* — Abelman, Frayne & Schwab

(57) ABSTRACT

The present invention relates to a detachable voltage sensing module and a battery device having same. The voltage sensing module comprises: a body on which are fixed a plurality of bus bars, which are connected to the cell tabs of battery cells; a substrate on which a control circuit is formed and which is detachably attached to the body; a jack terminal, disposed on the substrate, for connecting the battery cells to the substrate, when the substrate is being attached to the body, by connecting to one end of each of the bus bars; and a fixing means for fixing the substrate to the body. A detachable voltage sensing module formed as described above and a battery device having same, according to the present invention, are formed such that bus bars can be assembled on or disassembled from a substrate, and thus the (Continued)

substrate can be replaced at any time, thereby enabling easy assembly, maintenance and repair.

16 Claims, 5 Drawing Sheets

(51) Int. Cl.
  *B60L 3/00* (2006.01)
  *B60L 3/04* (2006.01)
  *B60L 3/12* (2006.01)
  *B60L 11/18* (2006.01)
  *H01M 2/10* (2006.01)
  *H01M 2/30* (2006.01)

(52) U.S. Cl.
  CPC ............ *B60L 3/12* (2013.01); *B60L 11/1859* (2013.01); *B60L 11/1861* (2013.01); *B60L 11/1864* (2013.01); *B60L 11/1879* (2013.01); *H01M 2/10* (2013.01); *H01M 2/1077* (2013.01); *H01M 2/30* (2013.01); *H01M 2/305* (2013.01); *H01M 10/4235* (2013.01); *H01M 10/4257* (2013.01); *H01M 10/48* (2013.01); *H01M 10/482* (2013.01); *B60L 2240/545* (2013.01); *B60L 2240/547* (2013.01); *B60L 2240/549* (2013.01); *B60L 2270/145* (2013.01); *H01M 2010/4271* (2013.01); *H01M 2200/00* (2013.01); *H01M 2220/20* (2013.01); *Y02T 10/7005* (2013.01); *Y02T 10/7044* (2013.01); *Y02T 10/7061* (2013.01)

(56) References Cited

FOREIGN PATENT DOCUMENTS

| | | |
|---|---|---|
| KR | 10-2012-0132338 A | 12/2012 |
| KR | 10-2013-0117289 A | 10/2013 |
| WO | 2012-144844 A3 | 10/2012 |

* cited by examiner

DETACHABLE VOLTAGE SENSING MODULE AND BATTERY DEVICE HAVING SAME

CLAIM FOR PRIORITY

This application claims priority to Korean Patent Application No. 10-2013-0137577filed on 13 Nov. 2013.

TECHNICAL FIELD

The present invention relates to a detachable voltage sensing module and a battery device having the same.

BACKGROUND ART

A secondary battery is used as a power source for various devices ranging from mobile devices to electric vehicles or hybrid vehicles due to its repetitive charge and discharge capability. In addition, new battery models that are capable of generating stronger power while being physically compact are being continuously developed as technologies in the field advance.

A secondary battery module that is applied to electric vehicles or hybrid vehicles is a battery that is modulized by being electrically connected with a plurality of battery cells. Such a module is called medium and large sized battery pack and is used due to the necessity of high energy storage capacity. The medium and large sized battery pack is configured such that a plurality of battery cells are received in a casing by being layering and is electrically connected.

In particular, the casing is provided with a voltage sensing module that detects and controls voltage, current, and temperature of the battery cells so as to prevent a fire or an explosion caused by overcharge, overdischarge, overcurrent, heating, and a series of side reactions of the battery cells.

The battery pack is a combination of a plurality of the battery cells, so in the case that some of the battery cells are overvoltaged, overcurrented, or overheated, safety and operational efficiency is not guaranteed. Thus, the voltage sensing module is provided so as to detect and control voltage, current, and temperature of the battery cells.

FIG. 1 is a view illustrating a battery device 11 that is provided with a conventional voltage sensing module 15.

As shown in FIG. 1, a voltage sensing module 15 is connected to cell tabs 13a of a plurality of layered battery cells 13. The voltage sensing module 15 is electrically connected with respective cell tabs 13a of the battery cells 13 via bus bars 19, thereby detecting output voltage and current of respective battery cells 13.

The conventional voltage sensing module 15 includes: an insulating body 17; a control substrate 21 mounted to the body 17; and a plurality of bus bars 19 being connected to the cell tabs 13a in a state where the bus bars 19 are fixedly mounted to the body 17, wherein an end of respective bus bars 19 is soldered to a control circuit of the substrate 21. The bus bars 19 convey output voltage of the battery cells 13 to the substrate 21 so as to allow the control circuit provided in the substrate 21 to take appropriate control.

Reference numeral 23 refers to a soldering area where the bus bars 19 are soldered to the substrate 21. In other words, bus bars 19 are soldered to the control circuit of the substrate 21.

However, the conventional voltage sensing module 15 is problematic in that the bus bars 19 are soldered to the substrate 21, whereby the assembly process of the voltage sensing module 15 is inconvenient.

To be more specific, the bus bars are heated and soldered to the substrate in a state where a first end of the associated one of the bus bars 19 is inserted into a slit formed on the substrate 21, and thus the soldering process is inconvenient. In particular, in the case of bad welding, it is possible to damage a pattern of the control circuit and to short-circuit the control circuit.

In addition, the bus bars 19 are soldered to the substrate 21, whereby it is impossible to replace only the substrate 21 when the substrate 21 has a problem. For example, when a pattern of the substrate 21 is damaged or a component, such as a fuse, is broken, it is impossible to disassemble the substrate 21 from the battery device. Thus, the battery device 11 or the whole battery pack should be replaced due to a problem of the substrate. This kind of problem frequently occurs in the case of electric vehicles or hybrid vehicles that endure shaking and shocks due to driving.

DISCLOSURE

Technical Problem

Accordingly, the present invention has been devised to solve the above-mentioned problems, and an object of the present invention is to provide a detachable voltage sensing module and a battery device having the same, wherein bus bars are detachably mounted to a substrate, whereby the substrate can be replaced when necessary. Thus, it is easy to assemble and maintain the voltage sensing module and the battery device.

Technical Solution

In order to accomplish the above object, the present invention provides a detachable voltage sensing module, the voltage sensing module including: a body having a plurality of bus bars locked thereto, the bus bars being connected to cell tabs of battery cells; a substrate provided with a control circuit, and detachably mounted to the body; jack terminals disposed on the substrate for connecting the battery cells to the substrate when the substrate is mounted to the body, by being connected to one end of the respective bus bars; and a locking means for locking the substrate to the body.

Further, the substrate may be provided with a plurality of insertion holes that are formed through the substrate; and the locking means may be provided on a surface of the body by protruding and includes elastic holders that are inserted into and locked to the insertion holes.

Further, each of the elastic holders may be an elastic member protruding toward the substrate, the elastic holder including: a slit formed along a central axis of the elastic holder so that each of the elastic holders is opened or closed via the slit; and a head provided on an end of each of the elastic holders, wherein when the head passes through an associated one of the insertion holes, the head being opened so as to be hooked to the insertion hole.

Further, a first end of each of the bus bars may protrude from the body, and each of the jack terminals may be made by pressing an elastic metal plate, each of the jack terminals including: a through hole for allowing the first end of each of the bus bars to pass therethrough; and a plurality of press connection pieces that are provided in the through hole and clamp the first end of the associated one of the bus bars, thereby locking the bus bar.

Further, the first end of each of the bus bars may be in a plane shape, and the press connection pieces may include: a first press connection piece that presses a first side of the associated one of the bus bars disposed between the press connection pieces; and a second press connection piece that corresponds to the first press connection piece and presses a second side of the bus bar.

The detachable voltage sensing module may further include: an anti-separation member that is provided at a location where the press connection pieces come into contact with the associated one of the bus bars, so the anti-separation member prevents the bus bar from separating caused by slipping.

Furthermore, the anti-separation member may be provided with teeth that are formed on a surface of each of the press connection pieces.

In order to accomplish the above object, the present invention further provides a battery device, the battery device including: a plurality of battery cells being layered in parallel with each other, wherein cell tabs that are provided at ends of the battery cells are connected to each other; a body where a plurality of bus bars are connected, the bus bars being connected to the cell tabs of the battery cells; a substrate being provided with a control circuit and detachably mounted to the body; jack terminals disposed on the substrate for connecting the battery cells to the substrate when the substrate is mounted to the body, by being connected to one end of the respective bus bars; and a locking means for locking the substrate to the body.

Further, the substrate may be provided with a plurality of insertion holes that are formed through the substrate; and the locking means may be provided on a surface of the body by protruding and includes elastic holders that are inserted into and locked to the insertion holes.

Further, each of the elastic holders may be an elastic member protruding toward the substrate, the elastic holder including: a slit formed along a central axis of the elastic holder so that each of the elastic holders is opened or closed via the slit; and a head provided on an end of each of the elastic holders, wherein when the head passes through an associated one of the insertion holes, the head is opened so as to be hooked to the insertion hole.

Further, a first end of each of the bus bars may protrude from the body, and each of the jack terminals may be made by pressing an elastic metal plate, each of the jack terminals including: a through hole for allowing the first end of each of the bus bars to pass therethrough; and a plurality of press connection pieces that are provided in the through hole and clamp the first end of the associated one of the bus bars, thereby locking the bus bar.

Further, the first end of each of the bus bars may be in a plane shape, and the press connection pieces may include: a first press connection piece that presses a first side of the associated one of the bus bars disposed between the press connection pieces; and a second press connection piece that corresponds to the first press connection piece and presses a second side of the bus bar.

Further, the battery device may further include: an anti-separation member that is provided at a location where the press connection pieces come into contact with the associated one of the bus bars, so the anti-separation member prevents the bus bar from separating caused by slipping.

Furthermore, the anti-separation member may be provided with teeth that are formed on a surface of each of the press connection pieces.

Hereinafter, features and advantages of the present invention will be described in detail with reference to the accompanying drawings.

While a preferred embodiment of the invention has been described using specific terms, such description is for illustrative purposes only, and it is to be understood that changes and variations may be made without departing from the spirit or scope of the following claims.

Advantageous Effects

A detachable voltage sensing module and a battery device having the same according to the present invention are configured such that bus bars are detachably coupled to a substrate, whereby the substrate can be replaced when necessary. Thus, it is easy to assemble and maintain the voltage sensing module and the battery device.

BEST MODE

Figure 1:
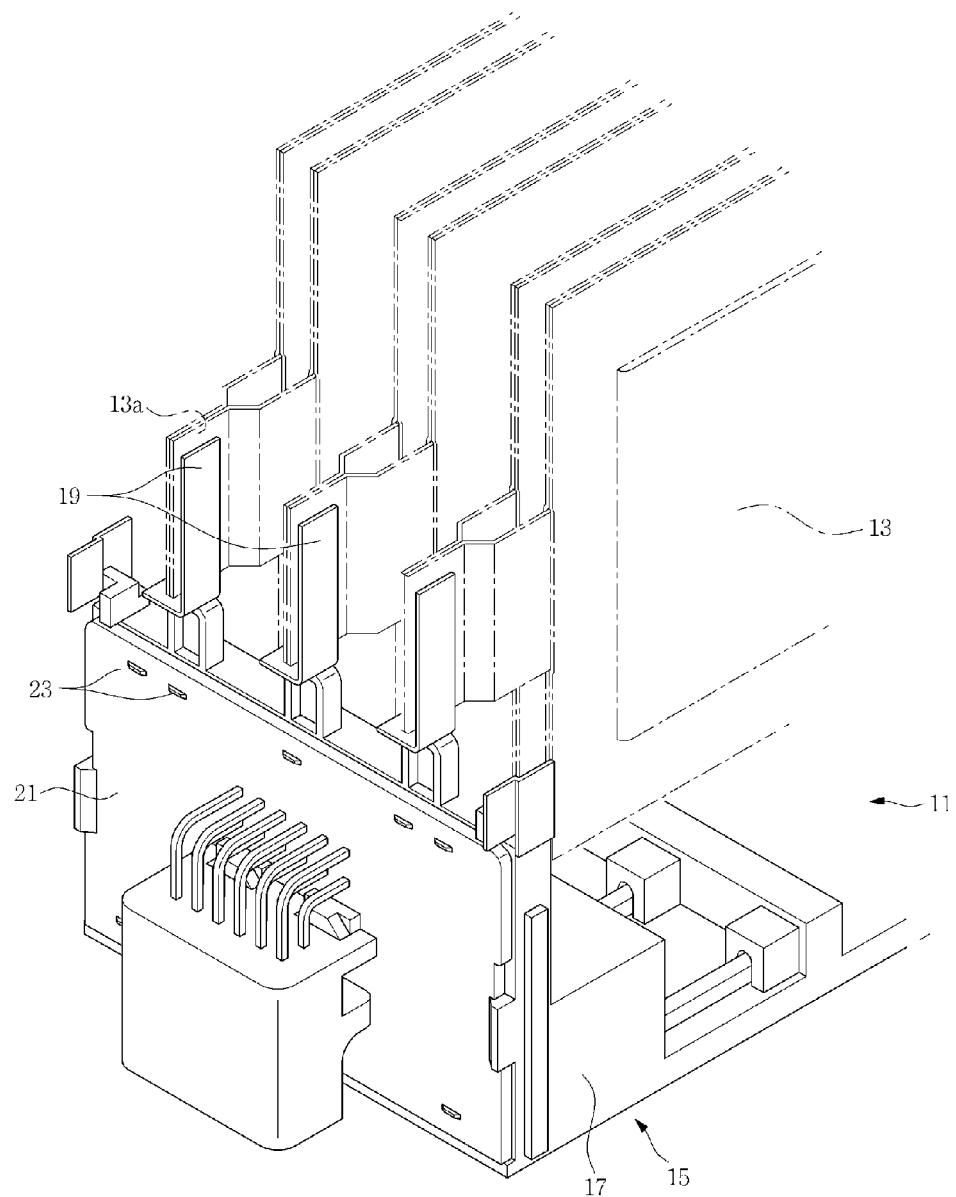
FIG. 1 is a view illustrating a problem of a conventional voltage sensing module.

The objects, features and advantages of the present invention will be more clearly understood from the following detailed description of the preferred embodiments taken in conjunction with the accompanying drawings.

Throughout the accompanying drawings, the same reference numerals are used to designate the same or similar components.

Further, in the following description, the terms "first", "second", "a first side", "a second side" and the like are used to differentiate a certain component from other components, but the configuration of such components should not be construed to be limited by the terms.

Further, in the description of the present invention, when it is determined that the detailed description of the related art would obscure the gist of the present invention, the description thereof will be omitted.

Hereinafter, preferred embodiments of the present invention will be described in detail with reference to the accompanying drawings.

Figure 2:
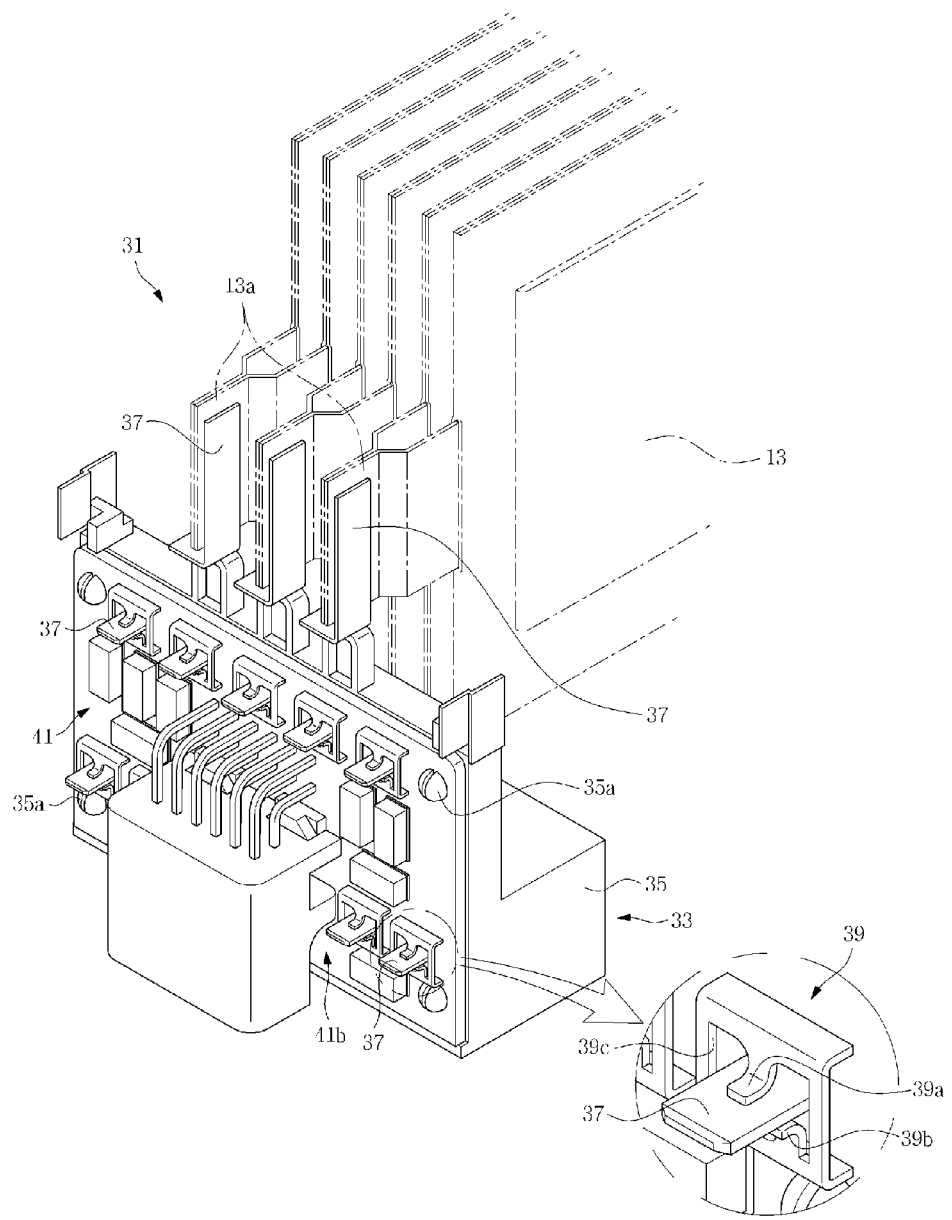
FIG. 2 is a view illustrating a battery device having a detachable voltage sensing module according to a first embodiment of the present invention.

FIG. 2 is a view illustrating a battery device 31 having a detachable voltage sensing module 33 according to a first embodiment of the present invention.

As shown in FIG. 2, the battery device 31 according to the first embodiment of the present invention includes: a plurality of battery cells 13 being layered in parallel with each other; and the voltage sensing module 33 being connected to cell tabs 13a of the battery cells 13 and detecting output voltage of each of the battery cells 13.

The battery cells 13, as a pouch type secondary battery, are provided with the cell tabs 13a on opposite ends thereof. Opposite cell tabs 13a are not shown in FIG. 2. It is possible to use a secondary battery that has anode and cathode cell tabs at a same end of the pouch, according to the first embodiment of the present invention.

Further, each of the cell tabs 13a of the battery cells 13 is connected to a neighboring one of the cell tabs 13a of the battery cells 13. Each of the cell tabs 13a is connected to bus bars 37 in a state where each of the cell tabs 13a is welded to the neighboring one of the cell tabs 13a.

Meanwhile, the voltage sensing module 33 includes: a body 35 having a plurality of bus bars 37 locked thereto, the bus bars 37 being connected to cell tabs of battery cells; a substrate 41 locked to a surface of the body 35; and a plurality of jack terminals 39 disposed on the substrate 41 and elastically connected with the bus bars 37.

Figure 3:
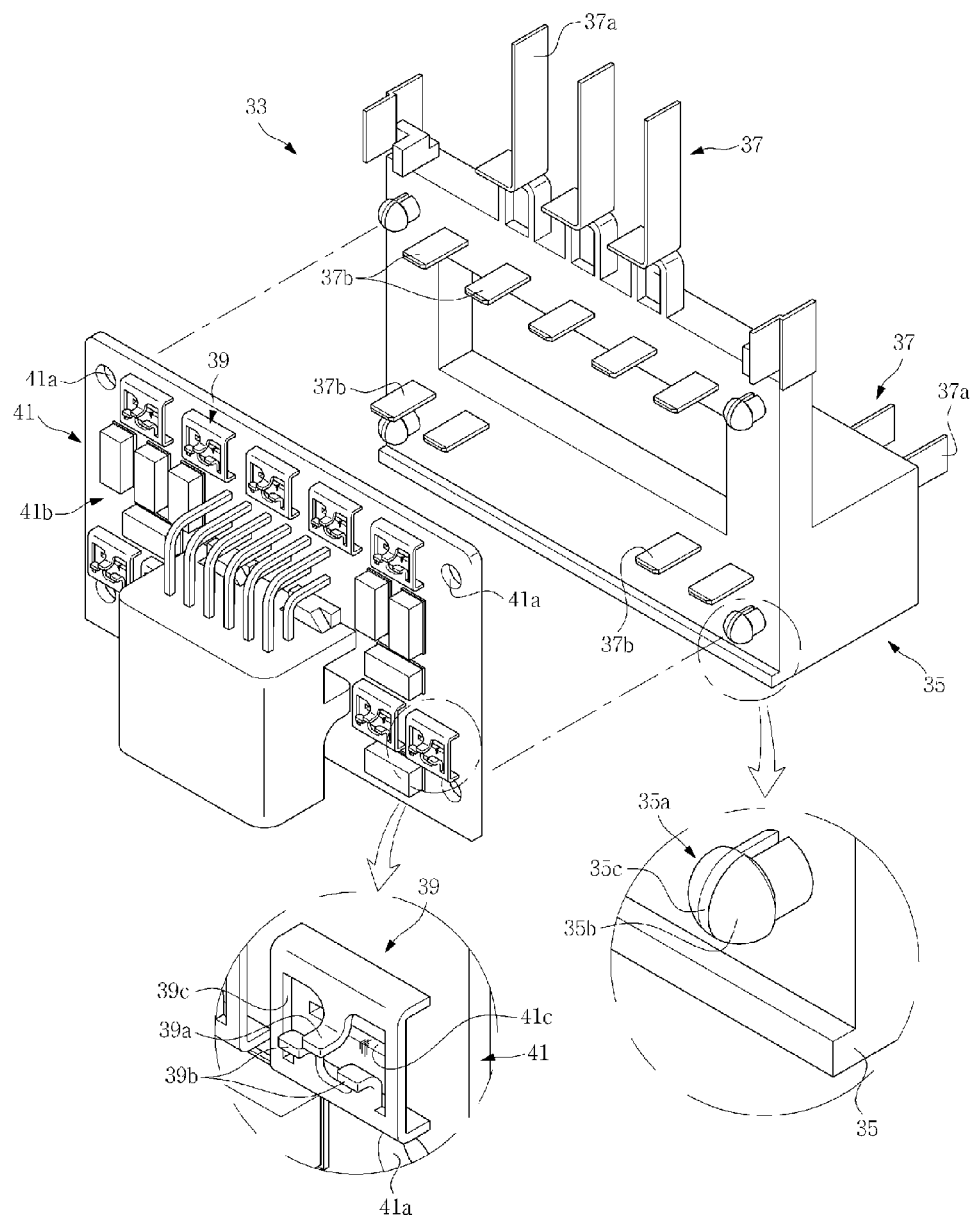
FIG. 3 is an exploded perspective view illustrating the voltage sensing module of FIG. 2.

The body 35 is made of a synthetic resin through injection molding, wherein the surface of the body 35 is provided with a plurality of elastic holders 35a of FIG. 3. The elastic holders 35a will be described hereinafter.

The bus bars 37, which are in a band shape with a predetermined thickness, are bent many times and a portion of each of the bus bars 37 is mounted within the body 35. The bus bars 37 are locked to the body 35 when the body 35 is insert-molded.

In particular, a first end of each of the bus bars 37 extends toward the substrate 41 such that the bus bars 37 are inserted into the jack terminals 39 by passing through the substrate 41 in a thickness direction thereof when the substrate 41 is mounted to the body 35. A second end of each of the bus bars 37 is connected to an associated one of the cell tabs 13a of the battery cells 13.

The jack terminals 39 are made by pressing an elastic metal plate, and are electrically connected to a control circuit 41b that is provided in the substrate 41. When the jack terminals 39 are mounted to the substrate 41 of the body 35 by clamping the first end of the bus bars 37 after passing through the substrate 41, the bus bars 37 are connected to the control circuit 41b.

The jack terminals 39 will be described hereinafter in detail with reference to FIG. 3.

Figure 4:
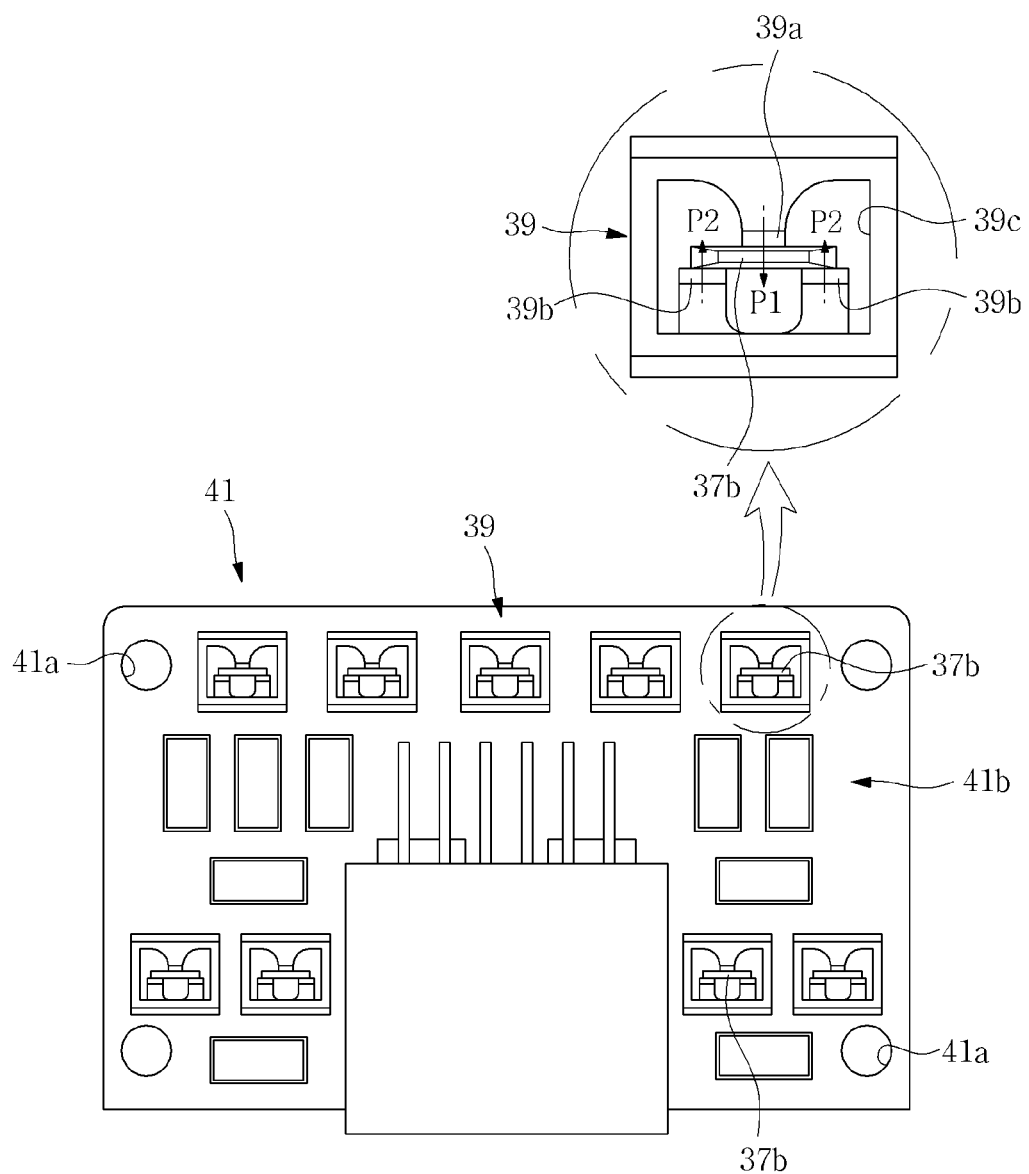
FIG. 4 is a view illustrating an operation of jack terminals of the voltage sensing module of FIG. 3.

FIG. 3 is an exploded perspective view illustrating the voltage sensing module 33 of FIG. 2; and FIG. 4 is a view illustrating an operation of the jack terminals of the voltage sensing module 33.

As shown in FIGS. 3 and 4, a plurality of the bus bars 37 are provided in an upper and lower portion of the body 35. The bus bars 37 that are disposed in the upper portion of the body 35 are connected to a first side of the cell tabs of the battery cells, while four bus bars 37 that are disposed in the lower portion of the body 35 are connected to a second side of the cell tabs of the battery cells.

While a portion of each of the bus bars 37 is embedded within the body 35, a first and a second end of the bus bars 37 are exposed to the outside and extends. The first end of each of the bus bars 37 is an insertion-connecting portion 37b. After the insertion-connecting portion 37b passes through a bus bar-through hole 41c that is provided in the substrate 41, in a thickness direction of the substrate 41, the insertion-connecting portion 37b is clamped by the associated one of the jack terminals 39. The second end of each of the bus bars 37 is a cell-welding portion 37a for allowing an associated one of the cell tabs to be welded thereto.

Meanwhile, four corners of the body 35 are provided with elastic holders 35a. The elastic holders 35a, as a protrusion, are in a quasi-cylindrical shape. A slit 35c that is formed along a central axis of the elastic holder divides each of the elastic holders 35a into two portions. Thus, each of the elastic holders 35a is opened or closed via the slit 35c.

Further, a head 35b is provided on an end of each of the elastic holders 35a. After the head 35b passes through an associated one of the insertion holes 41a, the head 35b is opened so as to be hooked to the insertion holes 41a, because the head 35b has a larger diameter than that of the rest.

The substrate 41 that is mounted to the body 35 is provided with the control circuit 41b. The control circuit 41b includes various electric components or a fuse, wherein the control circuit 41b detects voltage and current from the battery cells so as to prevent a fire or an explosion caused by overcharge, overdischarge, overcurrent, heating, and a series of side reactions of the battery cells.

Further, four corners of the substrate 41 are provided with insertion holes 41a. The insertion holes 41a serve as a through hole for allowing the elastic holders 35a to pass therethrough. An edge of each of the insertion holes 41a is hooked by the head 35b of the elastic holders 35a, whereby the substrate 41 comes into close contact with the body 35.

Further, the substrate 41 is provided with a plurality of bus bar-through holes 41c that allow the insertion-connecting portion 37b to pass therethrough. The bus bar-through holes 41c allow the insertion-connecting portion 37b of the bus bars 37 to pass therethrough, whereby the insertion-connecting portion 37b is connected to the associated one of the jack terminals 39.

The jack terminals 39 are made by pressing an elastic metal plate with a predetermined thickness. An upper and a lower portion of the jack terminals 39 are bent so as to be connected to the control circuit 41b of the substrate 41.

Further, a through hole 39c is provided in a center of each of the jack terminals 39, wherein a first press connection piece 39a and a second press connection piece 39b are integrally formed with the through hole 39c.

The first press connection piece 39a is bent downwardly, extending in a direction of the insertion-connecting portion 37b. On the other hand, the second press connection piece 39b is bent upwardly, extending in a direction of the insertion-connecting portion 37b. The second press connection piece 39b is a couple thereof.

Extension portions of the first press connection piece 39a and the second press connection piece 39b contact with opposite surfaces of the insertion-connecting portion 37b, respectively. In addition, the extension portions of the first press connection piece 39a and the second press connection piece 39b elastically press the opposite surfaces of the insertion-connecting portion 37b that is within the associated one of the jack terminals 39, in a direction of an arrow P1 an arrow P2. Thus, each of the battery cells 13 is electrically connected to the substrate 41 by elastic connection between the insertion-connecting portion 37b and the associated one of the jack terminals 39.

In particular, as the first and the second press connection piece 39a and 39b elastically press the insertion-connecting portion 37b, the first and the second press connection piece 39a and 39b cannot be broken with the insertion-connecting portion 37b by shaking from the outside. According to the conventional voltage sensing module, as the bus bars are soldered to the substrate, the bus bars are frequently broken from the substrate because soldering area is easily broken by shaking from the outside.

Figure 5:
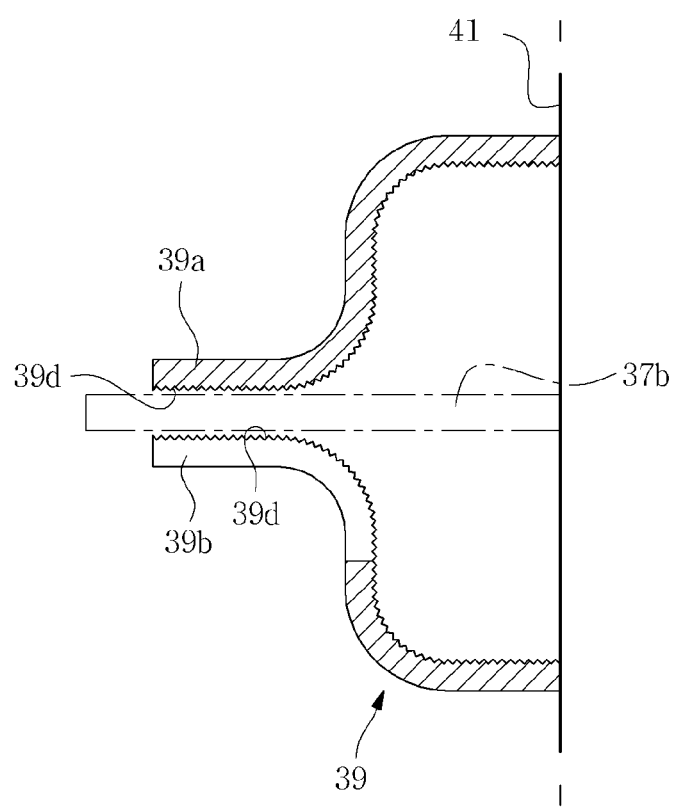
FIG. 5 is a side cross-sectional view illustrating the jack terminals of FIG. 4 according to a second embodiment of the present invention.

FIG. 5 is a side cross-sectional view illustrating the jack terminals of FIG. 4 according to the second embodiment of the present invention.

As shown in FIG. 5, an inner surface of the first press connection piece 39a and the second press connection piece 39b may be provided with teeth 39d. The teeth 39d are formed while the jack terminals 39 are made by pressing, wherein the teeth 39d successfully maintain connection between the insertion-connecting portion 37b and the associated one of the jack terminals 39. In other words, the teeth 39d clamp the insertion-connecting portion 37b, thereby preventing the insertion-connecting portion 37b from deviating from between the first and the second press connection piece 39a and 39b. Consequently, in the voltage sensing module 33 configured by the above description according to the embodiments of the present invention, the jack terminals 39 are used for connecting the bus bars to the substrate 21 instead of soldering, whereby the substrate 41 can be simply replaced when the substrate 41 is broken.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

DESCRIPTION OF REFERENCE CHARACTERS OF IMPORTANT PARTS

11: battery device
13: battery cells
13a: cell tabs
15: voltage sensing module
17: body
19: bus bars
21: substrate
23: soldering area
31: battery device
33: voltage sensing module
35: body
35a: elastic holders
35b: head
35c: slit
37: bus bars
37a: cell-welding portion
37b: insertion-connecting portion
39: jack terminals
39a: first press connection piece
39b: second press connection piece
39c: through hole
39d: teeth
41: substrate
41a: insertion holes
41b: control circuit
41c: bus bar-through hole

The invention claimed is:

1. A detachable voltage sensing module, comprising:
a body having a plurality of bus bars locked thereto, the bus bars being connected to cell tabs of battery cells;
a substrate provided with a control circuit, and detachably mounted to the body;
jack terminals disposed on the substrate for connecting the battery cells to the substrate when the substrate is mounted to the body, by being connected to one end of the respective bus bars; and
a locking means for locking the substrate to the body.

2. The detachable voltage sensing module of claim 1, wherein
the substrate is provided with a plurality of insertion holes that are formed through the substrate; and
the locking means is provided on a surface of the body by protruding and includes elastic holders that are inserted into and locked to the insertion holes.

3. The detachable voltage sensing module of claim 2, wherein each of the elastic holders is an elastic member protruding toward the substrate, the elastic holder including:
a slit formed along a central axis of the elastic holders so that each of the elastic holders is opened or closed via the slit; and
a head provided on an end of each of the elastic holders, wherein when the head passes through an associated one of the insertion holes, the head is opened so as to be hooked to the insertion hole.

4. The detachable voltage sensing module of claim 1, wherein
a first end of each of the bus bars protrudes from the body, and
each of the jack terminals is made by pressing an elastic metal plate, each of the jack terminals including:
a through hole for allowing the first end of each of the bus bars to pass therethrough; and
a plurality of press connection pieces that are provided in the through hole and clamp the first end of the associated one of the bus bars, thereby locking the bus bar.

5. The detachable voltage sensing module of claim 4, wherein
the first end of each of the bus bars is in a plane shape, and the press connection pieces include;
a first press connection piece that presses a first side of the associated one of the bus bars disposed between the press connection pieces; and
a second press connection piece that corresponds to the first press connection piece and presses a second side of the bus bar.

6. The detachable voltage sensing module of claim 5, further comprising:
an anti-separation member that is provided at a location where the press connection pieces come into contact with the associated one of the bus bars, so the anti-separation member prevents the bus bar from separating caused by slipping.

7. The detachable voltage sensing module of claim 4, further comprising:
an anti-separation member that is provided at a location where the press connection pieces come into contact with the associated one of the bus bars, so the anti-separation member prevents the bus bar from separating caused by slipping.

8. The detachable voltage sensing module of claim 7, wherein the anti-separation member is provided with teeth that are formed on a surface of each of the press connection pieces.

9. A battery device comprising:
a plurality of battery cells being layered in parallel with each other, wherein cell tabs that are provided at ends of the battery cells are connected to each other;
a body where a plurality of bus bars are connected, the bus bars being connected to the cell tabs of the battery cells;
a substrate being provided with a control circuit and detachably mounted to the body;
jack terminals disposed on the substrate for connecting the battery cells to the substrate when the substrate is mounted to the body, by being connected to one end of the respective bus bars; and
a locking means for locking the substrate to the body.

10. The battery device of claim 9, wherein
the substrate is provided with a plurality of insertion holes that are formed through the substrate; and the locking means is provided on a surface of the body by protruding and includes elastic holders that are inserted into and locked to the insertion holes.

11. The battery device of claim 10, wherein
each of the elastic holders is an elastic member protruding toward the substrate, the elastic holder including:
a slit formed along a central axis of the elastic holder so that each of the elastic holders is opened or closed via the slit; and
a head provided on an end of each of the elastic holders, wherein when the head passes through an associated one of the insertion holes, the head is opened so as to be hooked to the insertion hole.

12. The battery device of claim 9, wherein
a first end of each of the bus bars protrudes from the body, and
each of the jack terminals is made by pressing an elastic metal plate, each of the jack terminals including:
a through hole for allowing the first end of each of the bus bars to pass therethrough; and
a plurality of press connection pieces that are provided in the through hole and clamp the first end of the associated one of the bus bars, thereby locking the bus bar.

13. The battery device of claim 12, wherein
the first end of each of the bus bars is in a plane shape, and the press connection pieces include;
a first press connection piece that presses a first side of the associated one of the bus bars disposed between the press connection pieces; and
a second press connection piece that corresponds to the first press connection piece and presses a second side of the bus bar.

14. The battery device of claim 13, further comprising:
an anti-separation member that is provided at a location where the press connection pieces come into contact with the associated one of the bus bars, so the anti-separation member prevents the bus bar from separating caused by slipping.

15. The battery device of claim 12, further comprising:
an anti-separation member that is provided at a location where the press connection pieces come into contact with the associated one of the bus bars, so the anti-separation member prevents the bus bar from separating caused by slipping.

16. The battery device of claim 15, wherein the anti-separation member is provided with teeth that are formed on a surface of each of the press connection pieces.

\* \* \* \* \*